UNITED STATES PATENT OFFICE.

WILLIAM PFITZINGER, OF ELBERFELD, PRUSSIA, GERMANY, ASSIGNOR TO THE FARBENFABRIKEN, VORMALS FR. BAYER & CO., OF SAME PLACE.

THIOPARATOLUIDINE.

SPECIFICATION forming part of Letters Patent No. 406,952, dated July 16, 1889.

Application filed March 9, 1889. Serial No. 302,660. (No specimens.) Patented in England April 28, 1888, No. 6,319; in France May 11, 1888, No. 190,535; in Spain October 17, 1888, No. 8,634, and in Italy October 30, 1888, No. 24,011.

*To all whom it may concern:*

Be it known that I, WILLIAM PFITZINGER, chemist, a subject of the Emperor of Germany, residing at Elberfeld, Prussia, Germany, assignor to the FARBENFABRIKEN, VORMALS FR. BAYER & CO., of Elberfeld, have invented a new and useful Improvement in the Manufacture of Direct Dyeing Coloring-Matters, (the same having been patented to me or to my assignees, with my knowledge and consent, in England April 28, 1888, No. 6,319; in France May 11, 1888, No. 190,535; in Spain October 17, 1888, No. 8,634, and in Italy October 30, 1888, No. 24,011,) of which the following gives an exact description.

My invention relates to the manufacture of a new thio compound, the sulphonic acid of which is a dye-stuff dyeing unmordanted cotton in an alkaline soap bath a splendid greenish color. This sulphonic acid is derived from paratoluidine and is gained by sulphonating the new substance which results from the action of two molecules or more of sulphur on two molecules of paratoluidine. In the following I give an exact description of the manufacture of my new product and the properties which distinguish it from the known thioparatoluidines of Dahl, described in the German Letters Patent No. 35,790, which has lapsed, and the thioparatoluidines of Merz and Weith: About ten parts, by weight, of paratoluidine are melted and from about six to seven parts, by weight, of sulphur are added. This mixture is heated in an oil bath to 180°–220° centigrade, and a violent development of sulphureted hydrogen takes place. The temperature is finally raised to about 250° centigrade and maintained there until the evolution of gas ceases. The melt or liquid compound, which is of a deep-brown color, constitutes the new beta-thioparatoluidine. In order to purify it, it is boiled out with alcohol or concentrated hydrochloric acid. It remains then like a greenish-yellow powder, which does not melt even at 220° centigrade, and which is very difficultly soluble in boiling alcohol and concentrated hydrochloric acid, whereas the product of Dahl, gained by heating one molecule of sulphur with two molecules of paratoluidine, melts at 191°, and is easily soluble in hot alcohol and hot concentrated hydrochloric acid, and the isomeric product of Merz and Weith melts at 103° and is absolutely colorless. The most characteristic property of my new product is, however, that the soda salt of this sulphonic acid dyes unmordanted cotton in an alkaline bath with a fine greenish color, and that it is capable of giving a diazo compound on the fiber, which, after combination with phenols, amines, or their sulphonic and carboxylic acids, forms new dye-stuffs. This is the most characteristic property of my new thioparatoluidine, which distinguishes it from the known thioparatoluidines of Dahl and Weith, which do not possess the property to dye unmordanted cotton.

Having thus described my invention and in what manner it can be manufactured, that which I claim as new, and desire to secure by Letters Patent, is—

The new thioparatoluidine herein described, which is nearly insoluble in boiling alcohol and concentrated hydrogen chloride infusible at 220° centigrade, combining with fuming sulphuric acid to form a new sulphonic acid, the soda salt of which possesses the property of dyeing unmordanted cotton yellow in an alkaline bath, substantially as described.

WILLIAM PFITZINGER.

Witnesses:
ANTON KEUTER,
CONSTANTIN VON MERTSCHINSKY.